US012232622B2

(12) United States Patent
Zhu et al.

(10) Patent No.: US 12,232,622 B2
(45) Date of Patent: Feb. 25, 2025

(54) FOLDING STEP STOOL

(71) Applicant: JIANGSU ZHOU JIJIE INTELLIGENT TECHNOLOGY CO., LTD., Suqian (CN)

(72) Inventors: Xuelin Zhu, Suqian (CN); Baisong Yao, Suqian (CN); Weiqiang Liu, Suqian (CN)

(73) Assignee: JIANGSU ZHOU JIJIE INTELLIGENT TECHNOLOGY CO., LTD., Suqian (CN)

(*) Notice: Subject to any disclaimer, the term of this patent is extended or adjusted under 35 U.S.C. 154(b) by 884 days.

(21) Appl. No.: 17/384,830

(22) Filed: Jul. 26, 2021

(65) Prior Publication Data

US 2022/0369820 A1 Nov. 24, 2022

(30) Foreign Application Priority Data

May 19, 2021 (CN) ......................... 202121085854.6

(51) Int. Cl.
*A47C 12/00* (2006.01)
*E06C 1/393* (2006.01)

(52) U.S. Cl.
CPC .............. *A47C 12/00* (2013.01); *E06C 1/393* (2013.01)

(58) Field of Classification Search
CPC ................................ A47C 12/00; E06C 1/393
See application file for complete search history.

(56) References Cited

U.S. PATENT DOCUMENTS

| | | | | |
|---|---|---|---|---|
| 8,037,649 B2 * | 10/2011 | Jakubowski ........... | A47C 12/00 D25/63 |
| 8,701,830 B2 * | 4/2014 | Merey ..................... | E06C 1/383 108/92 |
| 9,986,843 B2 * | 6/2018 | Baker ..................... | A47C 12/00 |
| 11,903,486 B2 * | 2/2024 | Dokhanian ............ | A47C 4/045 |
| 2014/0131138 A1 * | 5/2014 | Simpson ................ | A47C 12/00 182/223 |

* cited by examiner

*Primary Examiner* — Hiwot E Tefera
*Assistant Examiner* — Daniel Alvarez
(74) *Attorney, Agent, or Firm* — Bayramoglu Law Offices LLC

(57) ABSTRACT

A folding step stool includes a stool surface and a support structure for supporting the stool surface. The support structure is a foldable structure and comprises at least three support shafts. The stool surface is hinged to a rear side of a connecting line of tops of two adjacent support shafts. After being folded, the support structure is located on one side of a plane formed by the two support shafts hinged to the stool surface. After being turned, the stool surface is located on the other side of the plane formed by the two support shafts to which the stool surface is hinged, and the two support shafts are able to abut against the two support shafts to which the stool surface is hinged. The invention solves the problem that step stools in the prior art still have a large size after being folded.

12 Claims, 7 Drawing Sheets

FOLDING STEP STOOL

CROSS REFERENCE TO THE RELATED APPLICATIONS

This application is based upon and claims priority to Chinese Patent Application No. 202121085854.6, filed on May 19, 2021, the entire contents of which are incorporated herein by reference.

TECHNICAL FIELD

The invention belongs to the technical field of step stools, and particularly, relates to a folding step stool.

BACKGROUND

Traditional two-step stools fabricated by one-step injection molding cannot be folded to be stored, thus being large in packaging size, high in transport cost and difficult to carry and transfer.

There are two types of folding two-step stools at present, wherein one type of the existing folding two-step stools are folded in the middle and are poor in structural stability, and the other type of the existing folding two-step stools merely adopt hinges for connection, thus being prone to shaking and poor in stability. In addition, all existing two-step stools still have a large size after being folded, and occupy a large space, which fails to meet user's requirements.

SUMMARY

The objective of the invention is to solve the above-mentioned problems of the prior art by providing a folding step stool which has a small size after being folded.

The objective of the invention may be fulfilled by the following technical solution: a folding step stool comprises a stool surface and a support structure for supporting the stool surface, wherein the support structure is a foldable structure and comprises at least three support shafts, and the stool surface is hinged to a rear side of a connecting line of the tops of two adjacent support shafts; after being folded, the support structure is located on one side of a plane formed by the two support shafts hinged to the stool surface; and after being turned, the stool surface is located on the other side of the plane formed by the two support shafts to which the stool surface is hinged, and are able to abut against the two support shafts to which the stool surface is hinged.

On the basis of the plane formed by the two support shafts, the support structure is located on one side of the plane after being folded, and the stool surface is located on the other side of the plane after being turned, so that the step stool has a smaller overall thickness, occupies a smaller area and has a smaller packaging size after being folded; and the stool surface abuts against the two support shafts after being turned, thus being not prone to breakage when transported.

According to the folding step stool, the support structure comprises a front plate and a rear plate, the support shafts are formed on two sides of the rear plate, the stool surface is hinged to the top of the rear plate, and a folding mechanism enabling the front plate and the rear plate to draw close to or away from each other is disposed between the front plate and the rear plate.

The stool surface is hinged to the top of the rear plate and can turned by an appropriate angle to reduce the storage space of the stool; and the distance between the front plate and the rear plate can be controlled by means of the folding mechanism, so that the step stool can be folded to be stored.

According to the folding step stool, the folding mechanism comprises first connecting plates and second connecting plates which are disposed between the front plate and the rear plate and are hinged together, two ends of said first connecting plate are hinged to the front plate and the rear plate respectively, and two ends of each second connecting plate are hinged to the front plate and the rear plate respectively. The first connecting plates and the second connecting plates can be turned to drive the front plate and the rear plate to move close to or away from each other.

As another solution of the folding step stool, the folding mechanism is a link structure disposed between the front plate and the rear plate. The link structure can also drive the front plate and the rear plate to draw close to or away from each other As another solution of the folding step stool, the support structure comprises a rear plate and side plates hinged to two sides of the rear plate, and the stool surface is hinged to the top of the rear plate. The support structure can fulfill a support effect.

According to the folding step stool, the stool surface comprises a secondary stool surface hinged to the top of the rear plate, and a primary stool surface is hinged to the top of the front plate; the number of the first connecting plates is two, and the two first connecting plates are hinged to two sides of the front plate respectively; the number of the second connecting plates is two, and the two second connecting plates are hinged to two sides of the rear plate respectively; and the secondary stool surface is higher than the primary stool surface.

The primary stool surface and the secondary stool surface allow users to step thereon, and the front plate and the rear plate are used to support the primary stool surface and the secondary stool surface, and can be connected more stably by means of the two first connecting plates and the two second connecting plates.

As another solution of the folding step stool, the stool surface comprises a secondary stool surface hinged to the top of the rear plate, a primary stool surface is hinged to the top of the front plate, an intermediate plate is disposed between the front plate and the rear plate, the secondary stool surface is higher than the primary stool surface, and the link structure is able to synchronously fold or unfold the front plate and the rear plate.

The primary stool surface and the secondary stool surface allow users to step thereon, the front plate, the intermediate plate and the rear plate are used to support the primary stool surface and the secondary stool surface, and the link structure is used to synchronously fold or unfold the front plate and the rear plate, so that the step stool is easy to operate and convenient to use.

As another solution of the folding step stool, the stool surface comprises a secondary stool surface hinged to the top of the rear plate, an intermediate plate is disposed between the front plate and the rear plate, a primary stool surface is hinged to the intermediate plate, the secondary stool surface is higher than the primary stool surface, the side plates comprise primary side plates disposed on two sides of the front plate and hinged to the front plate, as well as secondary side plates disposed on two sides of the rear plate and hinged to the rear plate, each primary side plate comprises two primary hinge plates that are hinged together, each secondary side plate comprises two secondary hinge plates that are hinged together, one of the primary hinge plates is hinged to the intermediate plate, one of the secondary side plates is hinged to the intermediate plate, a primary link structure for driving the primary side plates to be folded or unfolded when the primary stool surface is turned is disposed between the front plate and the intermediate plate, and a secondary anti-deviation structure for preventing the rear plate against lateral deviation is disposed between the rear plate and the intermediate plate.

The primary stool surface and the secondary stool surface allow users to step thereon, the front plate, the intermediate plate and the rear plate are used to support the primary stool surface and the secondary stool surface, and the primary side plates and the secondary side plates can be folded separately; the primary link structure is arranged to link the primary stool surface and the front plate, so that folding and unfolding are more convenient; and the secondary anti-deviation structure is arranged to prevent the rear plate against lateral deviation when the secondary side plates are folded or unfolded, so that the stability is guaranteed.

According to the folding step stool, the primary link structure comprises a first hinge member disposed between the front plate and the primary stool surface, the first hinge member has an end hinged to the front plate and an end hinged to the primary stool surface, and the length of the first hinge member is greater than half of the width of the primary side plates.

When one end of the primary stool surface leans against the front plate, the acute angle between the first hinge member and the primary stool surface is minimized, and the distance between the front plate and the intermediate plate is maximized; and the length of the first hinge member is greater than half of the width of the primary side plates, so that the front plate is driven by the first hinge member to move close to the intermediate plate when the primary stool surface is turned.

According to the folding step stool, the secondary anti-deviation structure comprises a second hinge member hinged to the intermediate plate and a third hinge member hinged to the rear plate, the second hinge member and the third hinge member are hinged together, and the sum of the length of the second hinge member and the length of the third hinge member is greater than the width of the secondary side plates in an unfolded and straightened state. The second hinge member and the third hinge member are hinged together, so that folding is facilitated; and the sum of the length of the second hinge member and the length of the third hinge member is greater than the width of the secondary side plates in the unfolded and straightened state, so that supporting is facilitated.

According to the folding step stool, a first fastener structure for fastening the primary stool surface on the front plate is disposed between the primary stool surface and the front plate. The first fastener structure disposed between the primary stool surface and the front plate ensures that a primary stool is stable enough after being unfolded.

According to the folding step stool, the first fastener structure comprises a fastening groove formed in the bottom surface of the primary stool surface and a fastening portion disposed at the top of the front plate, and the fastening portion is fastened in the fastening groove. The primary stool surface can be stably fastened at the top of the front plate by means of the fastening portion and the fastening groove.

As another solution of the folding step stool, the first fastener structure comprises a fastening portion disposed on the bottom surface of the primary stool surface and a fastening groove formed in the bottom of the front plate, and the fastening portion is fastened in the fastening groove. The primary stool surface can still be fastened on the front plate after the position of the fastening portion and the position of the fastening groove are exchanged.

According to the folding step stool, a second fastener structure for fastening the secondary stool surface on the intermediate plate is disposed between the secondary stool surface and the intermediate plate. The second fastener structure disposed between the secondary stool surface and the intermediate plate ensures that the step stool is stable enough after being unfolded.

According to the folding step stool, the second fastener structure comprises a fastening column disposed on the bottom surface of the secondary stool surface and a fastening hole formed in the top of the intermediate plate, and the fastening column is fastened in the fastening hole. The secondary stool surface can be stably fastened at the top of the intermediate plate by means of the fastening column and the fastening hole.

As another solution of the folding step stool, the second fastener structure comprises a fastening hole formed in the bottom surface of the secondary stool surface and a fastening column disposed at the top of the intermediate plate, and the fastening column is fastened in the fastening hole. The second stool surface can still be fastened on the intermediate plate after the position of the fastening column and the position of the fastening hole are exchanged.

According to the folding step stool, a first stop for restraining the primary side plates from being folded is disposed on the primary stool surface. The first stop disposed on the primary stool surface enhances the stability of the step stool in an unfolded state.

According to the folding step stool, a second stop for restraining the secondary side plates from being folded is disposed on the secondary stool surface. The second stop disposed on the secondary stool surface enhances the stability of the step stool in the unfolded state.

According to the folding step stool, anti-skid grains are disposed on the primary stool surface and the secondary stool surface respectively. The anti-skid grains disposed on the primary stool surface and the secondary stool surface fulfill an anti-skid effect.

Compared with the prior art, the invention has the following beneficial effects: on the basis of the plane formed by two support shafts, the support structure is located on one side of the plane after being folded, and the stool surface is located on the other side of the plane after being folded, so that the step stool has a smaller overall thickness, occupies a smaller area and has a smaller packaging size after being folded; the primary stool surface is hinged to the intermediate plate, and the secondary stool surface is also hinged to the intermediate plate, so that the step stool can be folded to be stored; the primary side plates and the secondary side plates can be folded or unfolded separately, so that the step steel can be folded in different forms, and the stability of the primary side plates and the secondary side plates in the unfolded state is enhanced; the first fastener structure ensures that a primary stool is stable enough, and the second fastener structure ensures that a secondary stool is stable enough; and the first stop is arranged to enhance the stability of the primary stool, and the second stop is arranged to enhance the stability of the secondary stool.

Figure 1:
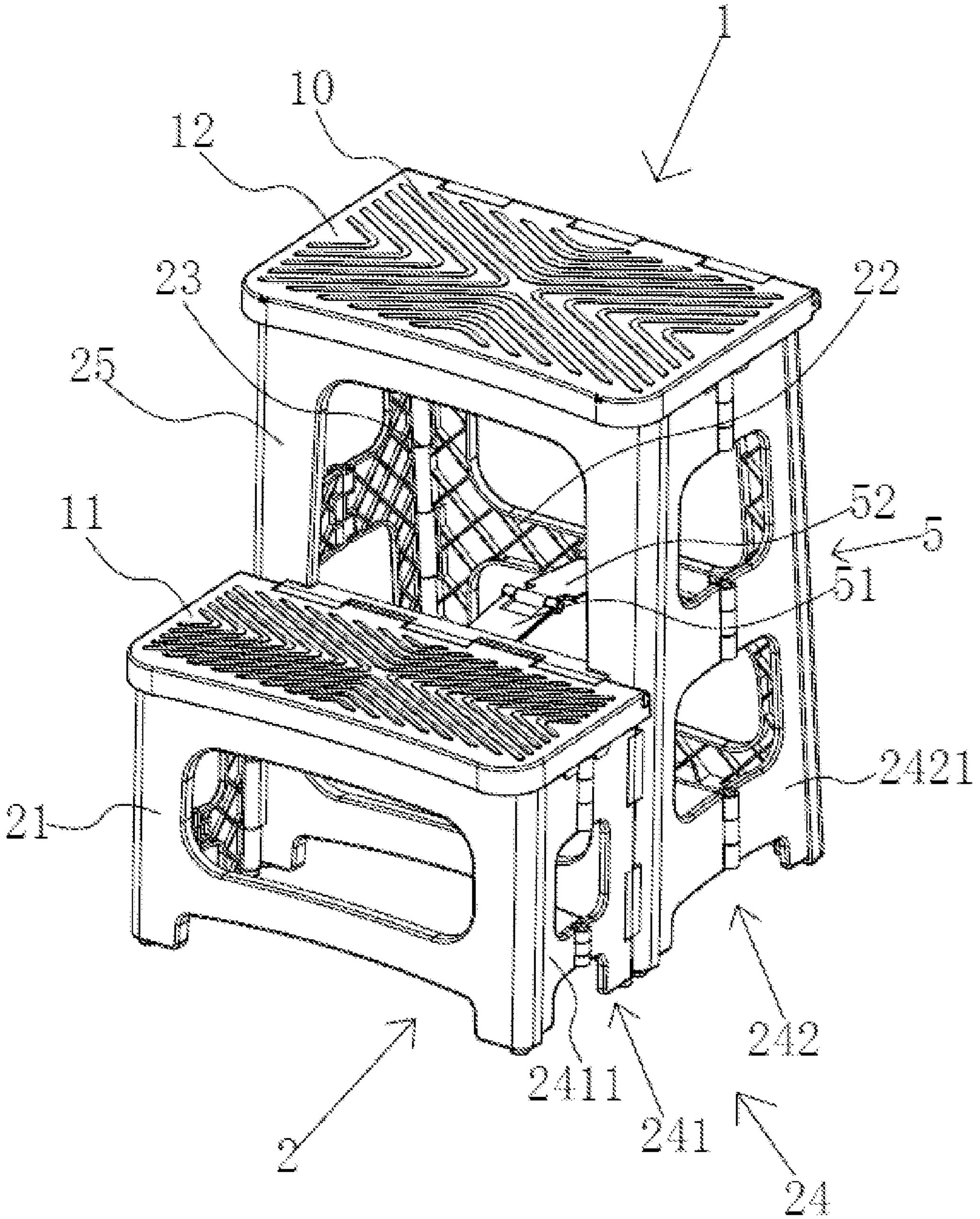
FIG. 1 is a first perspective structural view of Embodiment 1 of the invention.
Figure 2:
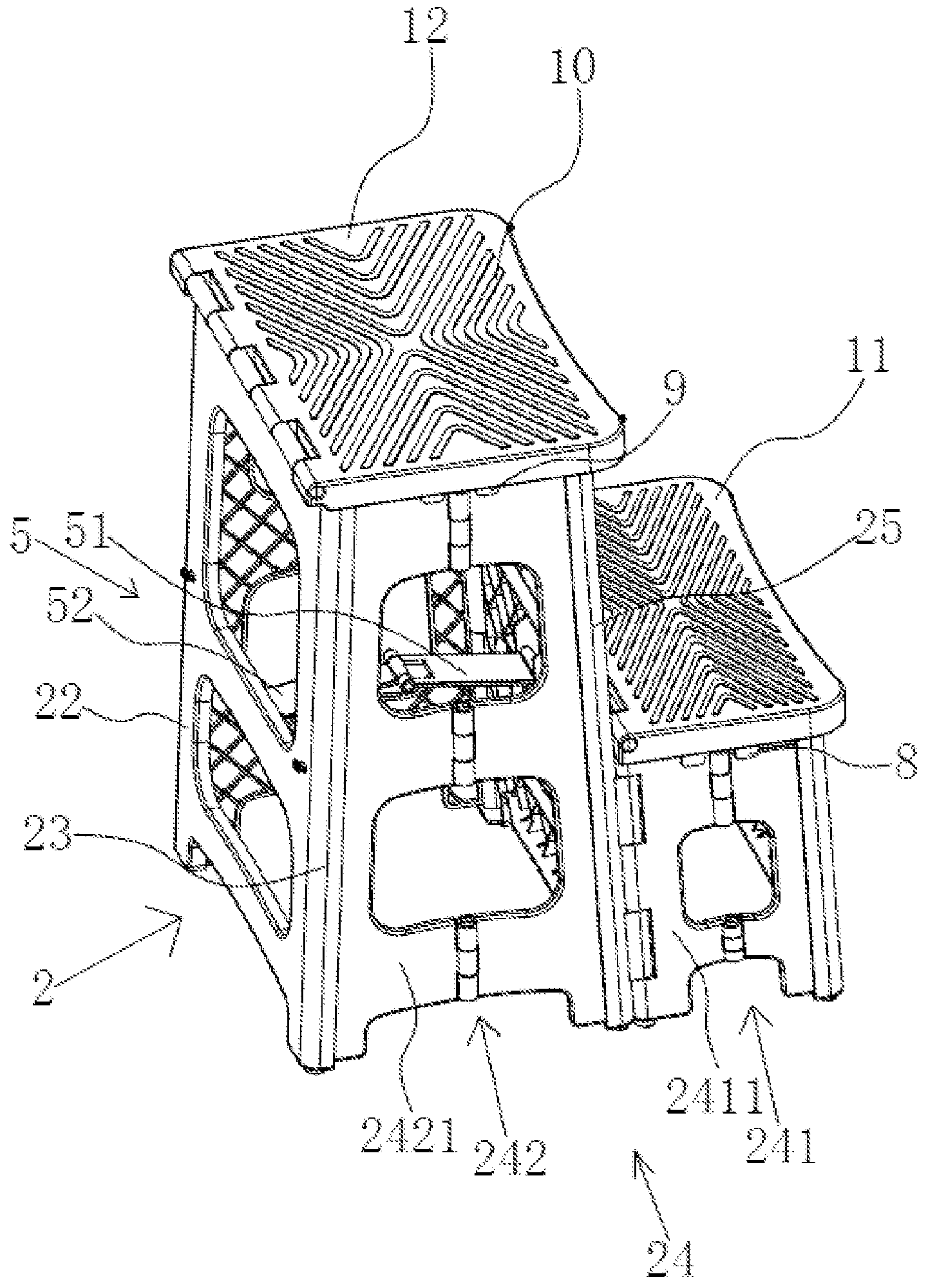
FIG. 2 is a second perspective structural view of Embodiment 1 of the invention.
Figure 3:
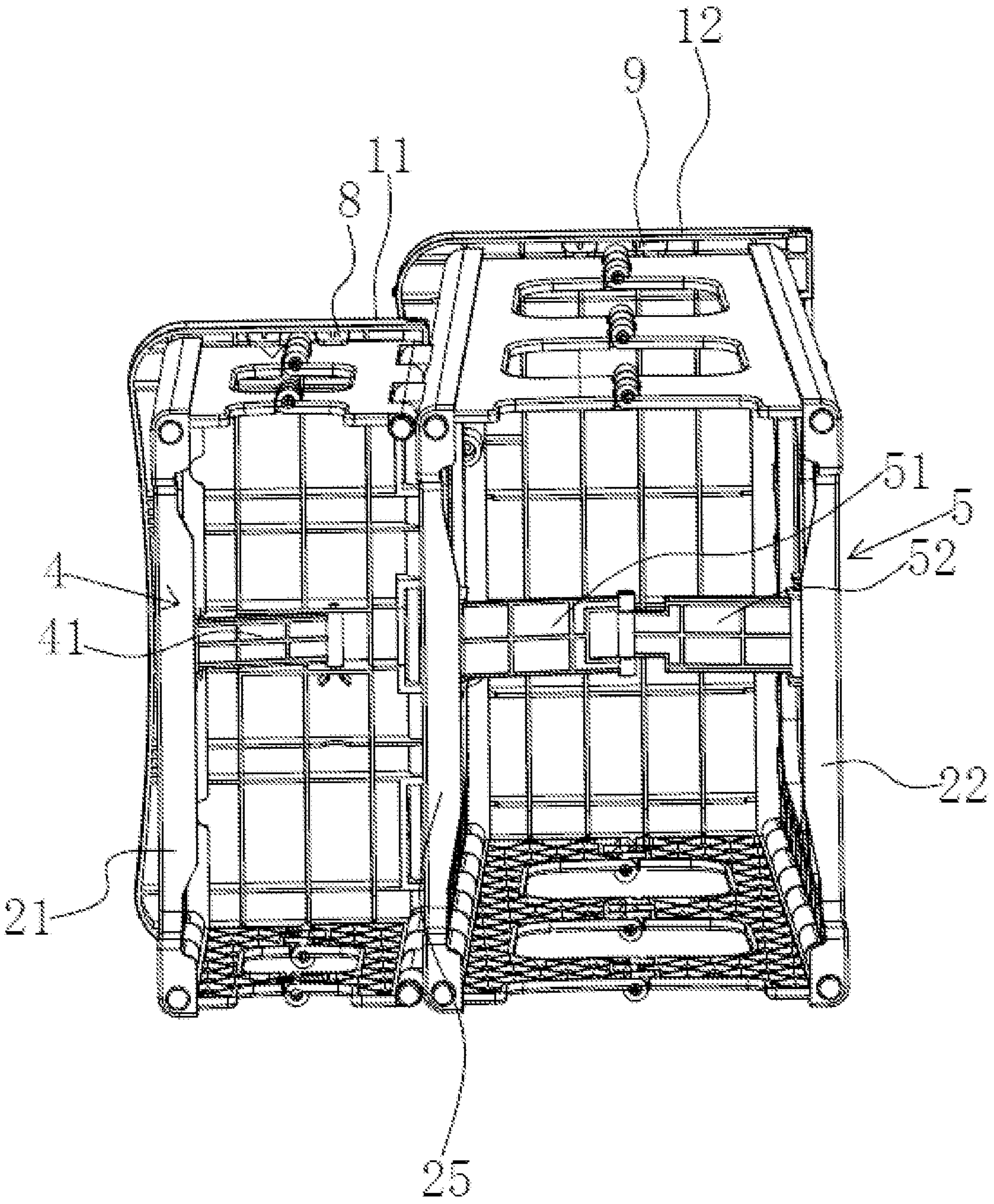
FIG. 3 is a third perspective structural view of Embodiment 1 of the invention.
Figure 4:
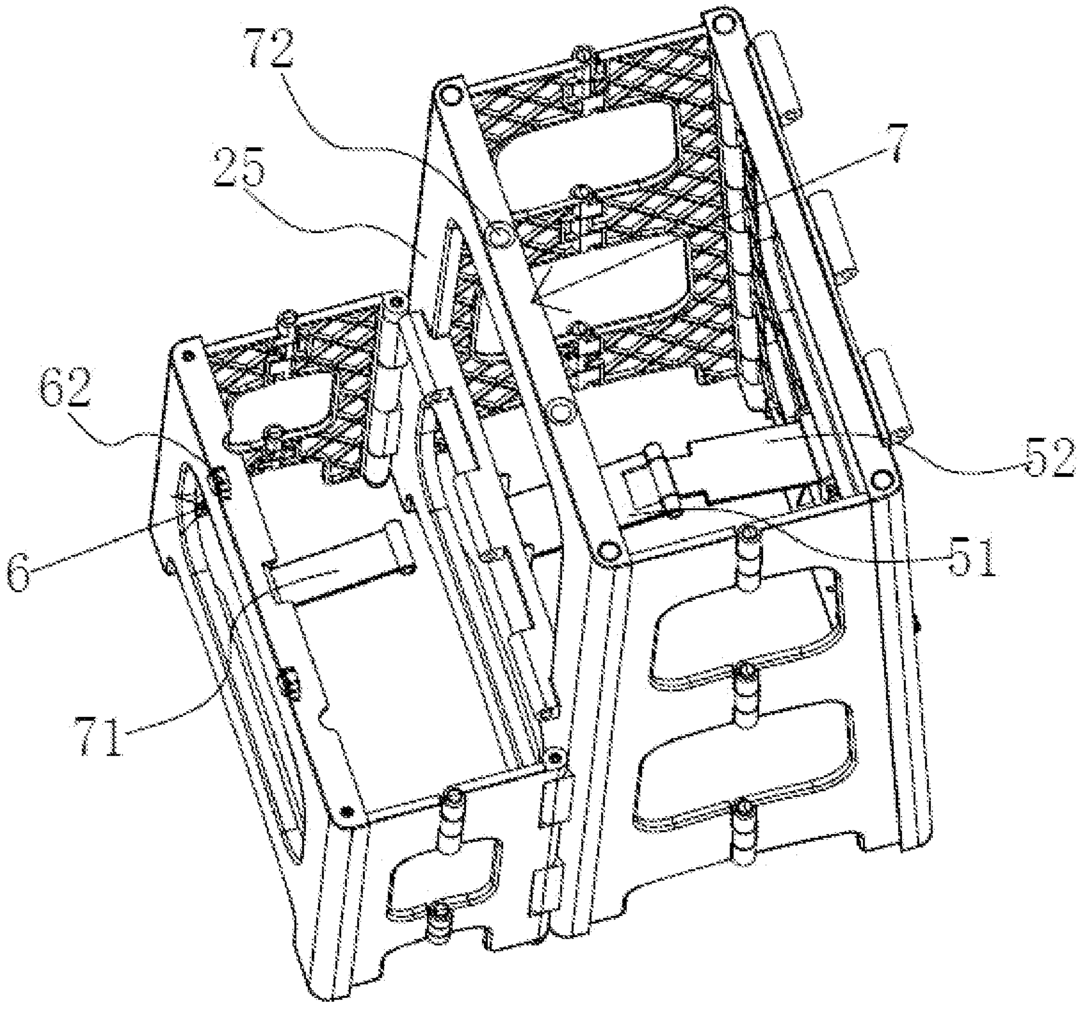
FIG. 4 is a perspective structural view of Embodiment 1 of the invention after a primary stool surface and a secondary stool surface are hidden.
Figure 5:
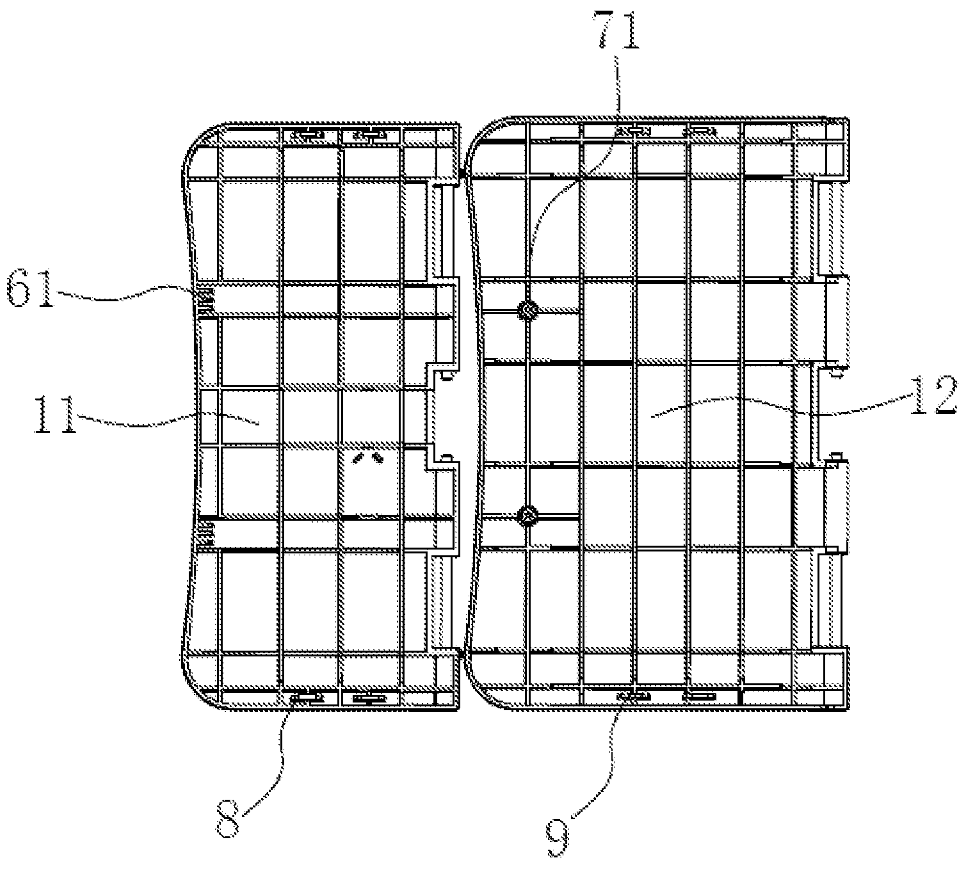
FIG. 5 is a bottom structural view of the primary stool surface and the secondary stool surface in Embodiment 1 of the invention.

In the figures: 1, stool surface; 11, primary stool surface; 12, secondary stool surface; 2, support structure; 21, front plate; 22, rear plate; 23, support shaft; 24, side plate; 241, primary side plate; 2411, primary hinge plate; 242, secondary side plate; 2421, secondary hinge plate; 25, intermediate plate; 3, folding mechanism; 31, first connecting plate; 32, second connecting plate; 4, primary link structure; 41, first hinge member; 5, secondary anti-deviation structure; 51, second hinge member; 52, third hinge member; 6, first fastener structure; 61, fastening groove; 62, fastening portion; 7, second fastener structure; 71, fastening column; 72, fastening hole; 8, first stop; 9, second stop; 10, anti-skid grain.

DETAILED DESCRIPTION OF THE EMBODIMENTS

The technical solutions of the invention will be further described below in conjunction with specific embodiments and accompanying drawings of the invention. Obviously, the invention is not limited to the following embodiments.

Embodiment 1

As shown in FIGS. 1-5, this embodiment provides a folding step stool which comprises a stool surface 1 and a support structure 2 for supporting the stool surface 1, wherein the support structure 2 is a foldable structure and comprises at least three support shafts 23, and the stool surface 1 is hinged to a rear side of a connecting line of the tops of two adjacent support shafts 23; after being folded, the support structure 2 is located on one side of a plane formed by the two support shafts 23 to which the stool surface 1 is hinged; after being turned, the stool surface 1 is located on the other side of the plane formed by the two support shafts 23 to which the stool surface 1 is hinged, and is able to abut against the two support shafts 23 to which the stool surface 1 is hinged.

On the basis of the plane formed by the two support shafts 23, the support structure 2 is located on one side of the plane after being folded, and the stool surface 1 is located on the other side of the plane after being turned, so that the step stool has a smaller overall thickness, occupies a smaller area and has a smaller packaging size after being folded; and the stool surface 1 abuts against the two support shafts 23 after being turned, thus being not prone to breakage when transported.

The support structure 2 comprises a rear plate 22 and side plates 24 hinged to two sides of the rear plate 22, and the stool surface 1 is hinged to the top of the rear plate 22. The stool surface 1 comprises a secondary stool surface 12 hinged to the top of the rear plate 22, an intermediate plate 25 is disposed between a front plate 21 and the rear plate 22, a primary stool surface 11 is hinged to the intermediate plate 25, and the secondary stool surface 12 is higher than the primary stool surface 11; the side plates 24 comprise primary side plates 241 disposed on two sides of the front plate 21 and hinged to the front plate 21, as well as secondary side plates 242 disposed on the two sides of the rear plate 22 and hinged to the rear plate 22; each primary side plate 241 comprises two primary hinge plates 2411 that are hinged together, and each secondary side plate 242 comprises two secondary hinge plates 2421 that are hinged together; one of the primary hinge plates 2411 is hinged to the intermediate plate 25, and one of the secondary hinge plates 2421 is hinged to the intermediate plate 25; a primary link structure 4 for driving the primary side plates 241 to be folded or unfolded when the primary stool surface 11 is turned is disposed between the front plate 21 and the intermediate plate 25, and a secondary anti-deviation structure 5 for preventing the rear plate 22 against lateral deviation is disposed between the rear plate 22 and the intermediate plate 25.

The primary stool surface 11 and the secondary stool surface 12 allow users to step thereon, the front plate 21, the intermediate plate 25 and the rear plate 22 are used to support the primary stool surface 11 and the secondary stool surface 12, and the primary side plates 241 and the secondary side plates 242 can be folded separately; the primary link structure 4 is arranged to link the primary stool surface 11 and the front plate 21, so that folding and unfolding are more convenient; and the secondary anti-deviation structure 5 is arranged to prevent the rear plate 22 against lateral deviation when the secondary side plates 242 are folded or unfolded, so that the stability is guaranteed.

The primary link structure comprises a first hinge member 41 disposed between the front plate 21 and the primary stool surface 11, one end of the first hinge member 41 is hinged to the front plate 21, the other end of the first hinge member 41 is hinged to the primary stool surface 11, and the length of the first hinge member 41 is greater than half of the width of the primary side plates 241. When one end of the primary stool surface 11 leans against the front plate 21, the acute angle between the first hinge member 41 and the primary stool surface 11 is minimized, and the distance between the front plate 21 and the intermediate plate 25 is maximized; and the length of the first hinge member 41 is greater than half of the width of the primary side plates 241, so that the front plate 21 is driven by the first hinge member 41 to move close to the intermediate plate 25 when the primary stool surface 11 is turned.

The secondary anti-deviation structure 5 comprises a second hinge member 51 hinged to the intermediate plate 25 and a third hinge member 52 hinged to the rear plate 22, wherein the second hinge member 51 is hinged to the third hinge member 52, and the sum of the length of the second hinge member 51 and the length of the third hinge member 52 is greater than the width of the secondary side plates 242 in an unfolded and straightened state. The second hinge member 51 and the third hinge member 52 are hinged together, so that folding is facilitated; and the sum of the length of the second hinge member 51 and the length of the third hinge member 52 is greater than the width of the secondary side plates 242 in the unfolded and straightened state, so that supporting is facilitated.

A first fastener structure 6 for fastening the primary stool surface 11 on the front plate 21 is disposed between the primary stool surface 11 and the front plate 21. The first fastener structure 6 disposed between the primary stool surface 11 and the front plate 21 ensures that a primary stool is stable enough after being unfolded. The first fastener structure 6 comprises a fastening groove 61 formed in the bottom surface of the primary stool surface 11 and a fastening portion 62 disposed at the top of the front plate 21, and the fastening portion 62 is fastened in the fastening groove 61. The primary stool surface 11 can be stably fastened at the top of the front plate 21 by means of the fastening portion 62 and the fastening groove 61.

A second fastener structure 7 for fastening the secondary stool surface 12 on the intermediate plate 25 is disposed between the secondary stool surface 12 and the intermediate plate 25. The second fastener structure 7 disposed between the secondary stool surface 12 and the intermediate plate 25 ensures that the step stool is stable enough after being unfolded. The second fastener structure 7 comprises a fastening column 71 disposed on the bottom surface of the secondary stool surface 12 and a fastening hole 72 formed in the top of the intermediate plate 25, and the fastening column 71 is fastened in the fastening hole 72. The secondary stool surface 12 can be stably fastened at the top of the intermediate plate 25 by means of the fastening column 71 and the fastening hole 72.

A first stop 8 for restraining the primary side plates 241 from being folded is disposed on the primary stool surface 11. The first stop 8 disposed on the primary stool surface 11 enhances the stability of the step stool in an unfolded state. A second stop 9 for restraining the secondary side plates 242 from being folded is disposed on the secondary stool surface 12. The second stop 9 disposed on the secondary stool surface 12 enhances the stability of the step stool in the unfolded state. Anti-skid grains 10 are disposed on the primary stool surface 11 and the secondary stool surface 12 respectively. The anti-skid grains 10 disposed on the primary stool surface 11 and the secondary stool surface 12 are used to realize an anti-skid effect. The working principle of this embodiment is as follows: when the step stool needs to be unfolded, the front plate 21 and the rear plate 22 are directly pulled outwards, the primary side plates 241 and the secondary side plates 242 are straightened gradually in this process, one end of the primary stool surface 11 gradually approaches the top of the front plate 21, one end of the secondary stool surface 12 gradually approaches the top of the intermediate plate 25, the first stop 8 presses against the tops of the primary side plates 241 from outside, the second stop 9 presses against the tops of the secondary side plates 242 from outside, the fastening portion 62 on the primary stool surface 11 is fastened in the fastening groove 61 in the top of the front plate 21, the fastening column 71 on the secondary stool surface 12 is fastened in the fastening hole 72 in the top of the intermediate plate 25, and then, the step stool can be used by users; when the step stool needs to be folded, the primary stool surface 11 is separated from the front plate 21, the secondary stool surface 12 is separated from the intermediate plate 25, then the primary stool surface 11 and the secondary stool surface 12 are turned, the first hinge member 41 on the primary stool surface 11 rotates when the primary stool surface 11 is turned, and drives the front plate 21 to approach the intermediate plate 25, the primary side plates 241 are folded accordingly, the secondary side plates 242 are directly pushed by the rear plate 22 to approach the intermediate plate 3 to be folded, the secondary stool surface 12 is turned by about 270° to cling to the rear plate 22, and the step stool can be stored in an appropriate place after being folded.

Embodiment 2

Figure 6:
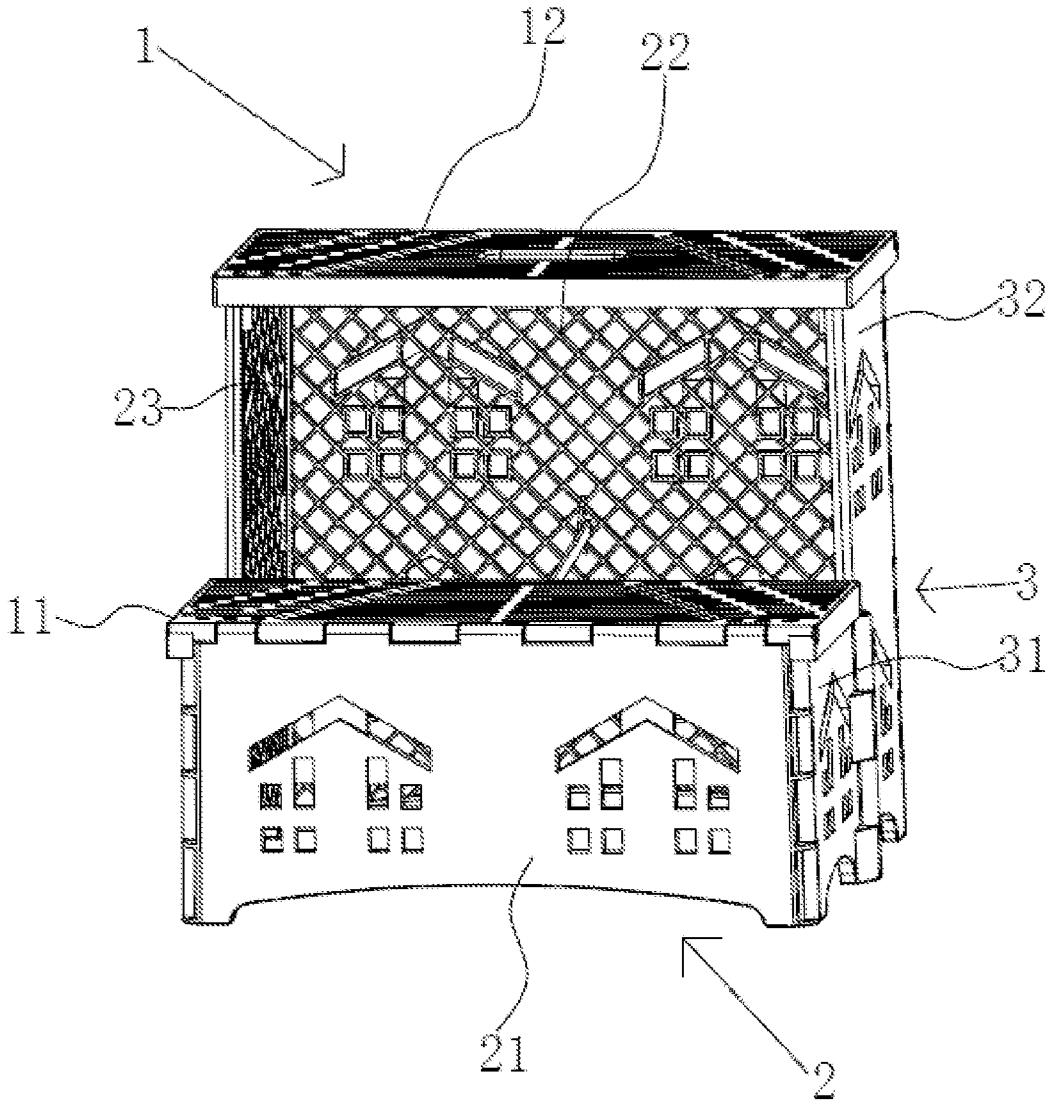
FIG. 6 is a perspective structural view of Embodiment 2 of the invention.

As shown in FIG. 6, this embodiment is basically identical in structure with Embodiment 1 and differs from Embodiment 1 in the following aspects: the support structure 2 comprises a front plate 21 and a rear plate 22, the support shafts 23 are formed on two sides of the rear plate 22, the stool surface 1 is hinged to the top of the rear plate 22, and a folding mechanism 3 for drawing the front plate 21 and the rear plate 22 close to or away from each other is disposed between the front plate 21 and the rear plate 22. The stool surface 1 is hinged to the top of the rear plate 22 and thus can be turned by an appropriate angle to reduce the storage space of the step stool; and the distance between the front plate 21 and the rear plate 22 can be controlled by means of the folding mechanism 3, so that the step stool can be stored easily after being folded.

The folding mechanism 3 comprises first connecting plates 31 and second connecting plates 32 which are disposed between the front plate 21 and the second plate 22 and are hinged together, two ends of each first connecting plate 31 are hinged to the front plate 21 and the rear plate 22 respectively, and two ends of each second connecting plate 32 are hinged to the front plate 21 and the rear plate 22 respectively. The first connecting plates 31 and the second connecting plates 32 can be turned to draw the front plate 21 and the rear plate 22 close to or away from each other.

The stool surface 1 comprises a secondary stool surface 12 hinged to the top of the rear plate 22, a primary stool surface 11 is hinged to the top of the front plate 21; the number of the first connecting plates 31 is two, and the two first connecting plates 31 are hinged to two sides of the front plate 21, respectively; the number of the second connecting plates 32 is two, and the two second connecting plates 32 are hinged to two sides of the rear plate 22, respectively; and the secondary stool surface 12 is higher than the primary stool surface 11. The primary stool surface 11 and the secondary stool surface 12 allow users to step thereon, and the front plate 21 and the rear plate 22 are used to support the primary stool surface 11 and the secondary stool surface 12, and can be connected more stably by means of the two first connecting plates 31 and the two second connecting plates 32.

Embodiment 3

Figure 7:
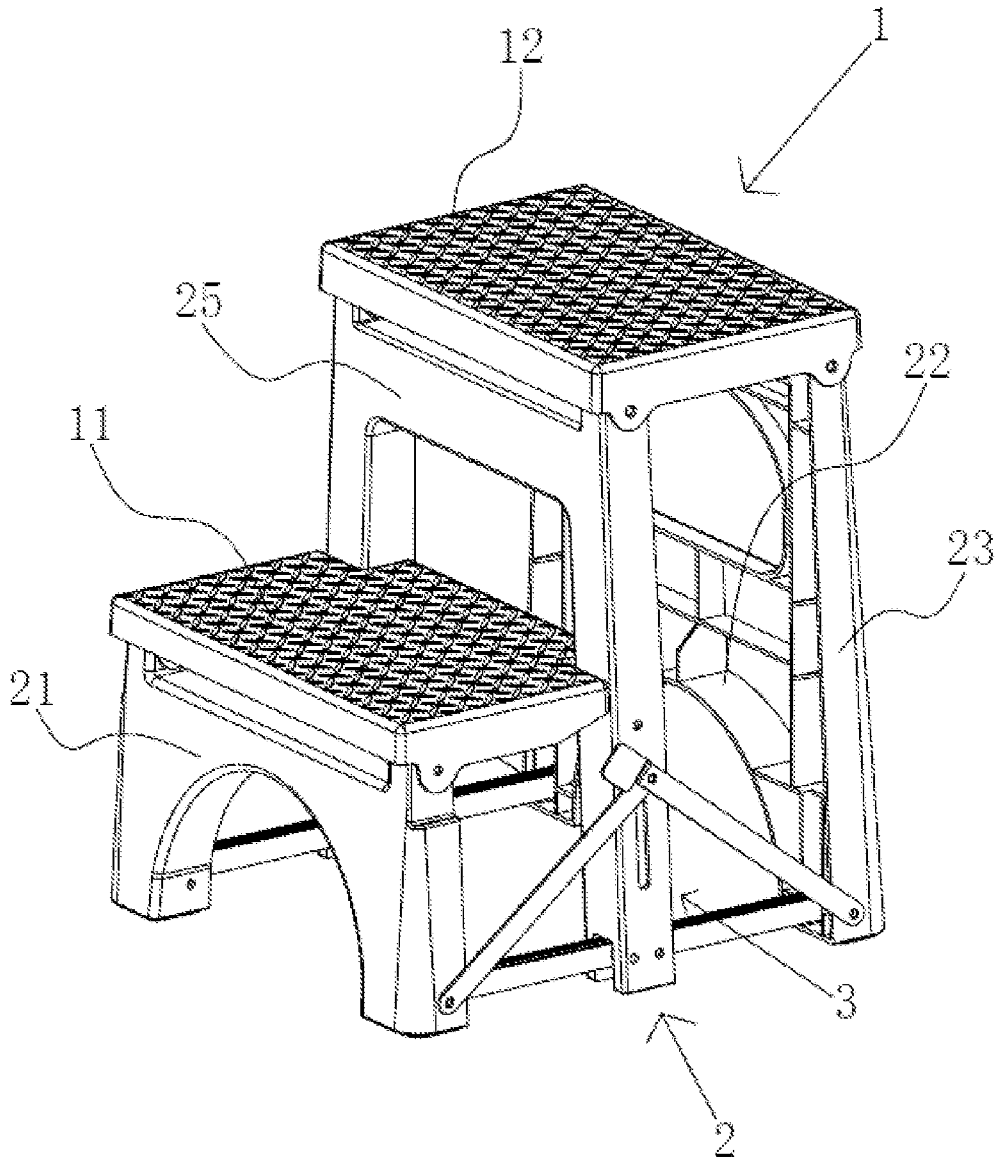
FIG. 7 is a perspective structural view of Embodiment 3 of the invention.

As shown in FIG. 7, this embodiment is basically identical in structure with Embodiment 2 and differs from Embodiment 2 in that the folding mechanism 3 is a link structure disposed between the front plate 21 and the rear plate 22. The link structure is able to drive the front plate 21 and the rear plate 22 to draw close to or away from each other.

The stool surface 1 comprises a secondary stool surface 12 hinged to the top of the rear plate 22, a primary stool surface 11 is hinged to the top of the front plate 21, an intermediate plate 25 is disposed between the front plate 21 and the rear plate 22, the secondary stool surface 12 is higher than the primary stool surface 11, and the front plate 21 and the rear plate 22 can be synchronously folded or unfolded by means of the link structure.

According to the invention, on the basis of the plane formed by two support shafts 23, the support structure 2 is located on one side of the plane after being folded, and the stool surface 1 is located on the other side of the plane after being folded, so that the step stool has a smaller overall thickness, occupies a smaller area and has a smaller packaging size after being folded; the primary stool surface 11 is hinged to the intermediate plate 25, and the secondary stool surface 12 is also hinged to the intermediate plate 25, so that the step stool can be folded to be stored; the primary side plates 241 and the secondary side plates 242 can be folded or unfolded separately, so that the step steel can be folded in different forms, and the stability of the primary side plates 241 and the secondary side plates 242 in the unfolded state is enhanced; the first fastener structure 6 ensures that a primary stool is stable enough, and the second fastener structure 7 ensures that a secondary stool is stable enough; and the first stop 8 is arranged to enhance the stability of the primary stool, and the second stop 9 is arranged to enhance the stability of the secondary stool.

The specific embodiments described in this specification are merely used to explain the spirit of the invention by way of examples. Those skilled in the art can make different amendments or supplements, or similar substitutions to these specific embodiments without departing from the spirit of the invention or exceeding the scope defined by the claims.

What is claimed is:

1. A folding step stool, comprising a stool surface and a support structure for supporting the stool surface, wherein the support structure is a foldable structure, the support structure comprises at least three support shafts, and the stool surface is hinged to a rear side of a connecting line of tops of two adjacent support shafts;

the folding step stool is structured such that, after being folded, the support structure is located on a first side of a plane formed by the two adjacent support shafts hinged to the stool surface; and after the stool surface is turned after the support structure is folded, the stool surface is located on a second side of the plane formed by the two adjacent support shafts hinged to the stool surface, and the support structure abuts against the two adjacent support shafts hinged to the stool surface, wherein the support structure comprises a rear plate and side plates hinged to two sides of the rear plate, and the stool surface is hinged to a top of the rear plate, wherein the stool surface comprises a primary stool surface, a secondary stool surface, and an intermediate plate, wherein the secondary stool surface is hinged to the top of the rear plate, the intermediate plate is disposed between a front plate and the rear plate, and the primary stool surface is hinged to the intermediate plate, wherein the secondary stool surface is higher than the primary stool surface, the side plates comprise primary side plates and secondary side plates, wherein the primary side plates are disposed on two sides of the front plate and hinged to the front plate, the secondary side plates are disposed on two sides of the rear plate and hinged to the rear plate, wherein each of the primary side plates comprises two primary hinge plates and the two primary hinge plates are hinged together, each of the secondary side plate comprises two secondary hinge plates and the two secondary hinge plates are hinged together, one of the two primary hinge plates is hinged to the intermediate plate, one of the two secondary hinge plates is hinged to the intermediate plate, a primary link structure is disposed between the front plate and the intermediate plate for driving the primary side plates to be folded or unfolded when the primary stool surface is turned, a secondary anti-deviation structure is disposed between the rear plate and the intermediate plate for preventing the rear plate against lateral deviation, and the primary link structure comprises a first hinge member disposed between the front plate and the primary stool surface, the first hinge member has a first end hinged to the front plate and a second end hinged to the primary stool surface, and a length of the first hinge member is greater than half of a width of the primary side plates.

2. The folding step stool according to claim 1, wherein the at least three support shafts are formed on the two sides of the rear plate.

3. The folding step stool according to claim 1, wherein the secondary anti-deviation structure comprises a second hinge member and a third hinge member, wherein the second hinge member is hinged to the intermediate plate and the third hinge member is hinged to the rear plate, the second hinge member and the third hinge member are hinged together, and a sum of a length of the second hinge member and a length of the third hinge member is greater than a width of the secondary side plates in an unfolded and straightened state.

4. The folding step stool according to claim 1, wherein a first fastener structure for fastening the primary stool surface on the front plate is disposed between the primary stool surface and the front plate.

5. The folding step stool according to claim 4, wherein the first fastener structure comprises a fastening groove and a fastening portion, wherein the fastening groove is formed in a bottom surface of the primary stool surface, the fastening portion is disposed at a top of the front plate, and the fastening portion is fastened in the fastening groove.

6. The folding step stool according to claim 1, wherein a second fastener structure for fastening the secondary stool surface on the intermediate plate is disposed between the secondary stool surface and the intermediate plate.

7. The folding step stool according to claim 6, wherein the second fastener structure comprises a fastening column and a fastening hole, wherein the fastening column is disposed on a bottom surface of the secondary stool surface, the fastening hole is formed in a top of the intermediate plate, and the fastening column is fastened in the fastening hole.

8. The folding step stool according to claim 6, wherein the second fastener structure comprises a fastening hole and a fastening column, wherein the fastening hole is formed in a bottom surface of the secondary stool surface, the fastening column is disposed at a top of the intermediate plate, and the fastening column is fastened in the fastening hole.

9. The folding step stool according to claim 1, wherein a first stop for restraining the primary side plates from being folded is disposed on the primary stool surface.

10. The folding step stool according to claim 1, wherein a second stop for restraining the secondary side plates from being folded is disposed on the secondary stool surface.

11. The folding step stool according to claim 1, wherein anti-skid grains are disposed on the primary stool surface and the secondary stool surface respectively.

12. A folding step stool, comprising a stool surface and a support structure for supporting the stool surface, wherein the support structure is a foldable structure, the support structure comprises at least three support shafts, and the stool surface is hinged to a rear side of a connecting line of tops of two adjacent support shafts;

the folding step stool is structured such that, after being folded, the support structure is located on a first side of a plane formed by the two adjacent support shafts hinged to the stool surface; and after the stool surface is turned after the support structure is folded, the stool surface is located on a second side of the plane formed by the two adjacent support shafts hinged to the stool surface, and the support structure abuts against the two adjacent support shafts hinged to the stool surface, wherein the support structure comprises a rear plate and side plates hinged to two sides of the rear plate, and the stool surface is hinged to a top of the rear plate, wherein the stool surface comprises a primary stool surface, a secondary stool surface, and an intermediate plate, wherein the secondary stool surface is hinged to the top of the rear plate, the intermediate plate is disposed between a front plate and the rear plate, and surface is hinged to the intermediate plate, wherein the secondary stool surface is higher than the primary stool surface, the side plates comprise primary side plates and secondary side plates, wherein the primary side plates are disposed on two sides of the front plate and hinged to the front plate, the secondary side plates are disposed on the two sides of the rear plate and hinged to the rear plate, wherein each of the primary side plates comprises two primary hinge plates and the two primary hinge plates are hinged together, each of the secondary side plate comprises two secondary hinge plates and the two secondary hinge plates are hinged together, one of the two primary hinge plates is hinged to the intermediate plate, one of the two secondary hinge plates is hinged to the intermediate plate, a primary link structure is disposed between the front plate and the intermediate plate for driving the primary side plates to be folded or unfolded when the primary stool surface is turned, a secondary anti-deviation structure is disposed between the rear plate and the intermediate plate for preventing the rear plate against lateral deviation, wherein a first fastener structure for fastening the primary stool surface on the front plate is disposed between the primary stool surface and the front plate, and wherein first fastener structure comprises a fastening portion and a fastening groove, wherein the fastening portion is disposed on a bottom surface of the primary stool surface, the fastening groove is formed in a bottom of the front plate, and the fastening portion is fastened in the fastening groove.

* * * * *